US012434217B2

(12) United States Patent
Hong et al.

(10) Patent No.: US 12,434,217 B2
(45) Date of Patent: Oct. 7, 2025

(54) DEVICE FOR CONTINUOUSLY PREPARING 2,6-DIHYDROXYBENZALDEHYDE

(71) Applicant: ASYMCHEM LABORATORIES (FUXIN) CO., LTD., Liaoning (CN)

(72) Inventors: Hao Hong, Morrisville, NC (US); Jiangping Lu, Tianjin (CN); Xichun Feng, Tianjin (CN); Xin Zhang, Tianjin (CN); Bo Yan, Tianjin (CN)

(73) Assignee: ASYMCHEM LABORATORIES (FUXIN) CO., LTD., Liaoning (CN)

( * ) Notice: Subject to any disclaimer, the term of this patent is extended or adjusted under 35 U.S.C. 154(b) by 698 days.

(21) Appl. No.: 17/642,194

(22) PCT Filed: Sep. 12, 2019

(86) PCT No.: PCT/CN2019/105754
§ 371 (c)(1),
(2) Date: Mar. 10, 2022

(87) PCT Pub. No.: WO2021/046815
PCT Pub. Date: Mar. 18, 2021

(65) Prior Publication Data
US 2022/0297080 A1   Sep. 22, 2022

(51) Int. Cl.
*B01J 19/18*   (2006.01)
*B01J 19/24*   (2006.01)
(Continued)

(52) U.S. Cl.
CPC ....... *B01J 19/1862* (2013.01); *B01J 19/1818* (2013.01); *B01J 19/242* (2013.01);
(Continued)

(58) Field of Classification Search
CPC .... B01J 19/0066; B01J 19/242; B01J 19/245; B01J 19/243; B01J 19/1862; B01J 19/1818
See application file for complete search history.

(56) References Cited

U.S. PATENT DOCUMENTS 6,294,684 B1 * 9/2001  de Bruin ................. C07C 68/06
558/274
2008/0194816 A1  8/2008  Yoshida et al.

FOREIGN PATENT DOCUMENTS

CN   107537423 A  *  1/2018
CN   108892616 A  *  11/2018 ........... C07C 67/313
(Continued)

OTHER PUBLICATIONS

Machine Translation of CN 10753423 (Year: 2018).*
(Continued)

*Primary Examiner* — Lessanework Seifu
(74) *Attorney, Agent, or Firm* — Dennemeyer & Associates LLC

(57) ABSTRACT

The present disclosure provides a device for continuously preparing 2,6-dihydroxybenzaldehyde and use thereof. The device includes a first continuous reaction unit for hydroxy protection reaction, a second continuous reaction unit for lithiation and hydroformylation, and a third continuous reaction unit for deprotection reaction that are connected in series. The third continuous reaction unit includes: a first columnar continuous reactor, connected to the second continuous reaction unit and used for deprotection of the lithiated hydroformylated product while performing liquid separation to obtain an organic phase containing 2,6-dihydroxybenzaldehyde and an aqueous phase.

20 Claims, 1 Drawing Sheet

(51) Int. Cl.
    *C07C 41/54*     (2006.01)
    *C07C 45/50*     (2006.01)
    *C07C 45/64*     (2006.01)

(52) U.S. Cl.
    CPC .............. *B01J 19/245* (2013.01); *C07C 41/54* (2013.01); *C07C 45/505* (2013.01); *C07C 45/64* (2013.01); *B01J 2219/00033* (2013.01); *B01J 2219/00094* (2013.01)

(56) References Cited

FOREIGN PATENT DOCUMENTS

| | | | |
|---|---|---|---|
| CN | 109152770 | A | 1/2019 |
| JP | 2016512823 | A | 5/2016 |
| JP | 2016514131 | A | 5/2016 |
| JP | 2017505347 | A | 2/2017 |
| JP | 2019516692 | A | 6/2019 |
| WO | 1998009967 | A | 3/1998 |

OTHER PUBLICATIONS

Machine Translation of CN 108892616 (Year: 2018).*
International Search Report issued in connection with PCT Application No. PCT/CN2019/105754 dated May 29, 2020.
Seto, Masaki et al. "Application of Continuous Flow-Flash Chemistry to Scale-up Synthesis of 5-Cyano-2-formylbenzoic Acid," Org. Process Res. Dev., vol. 23, No. 7, May 30, 2019, p. 1420-1428.

* cited by examiner

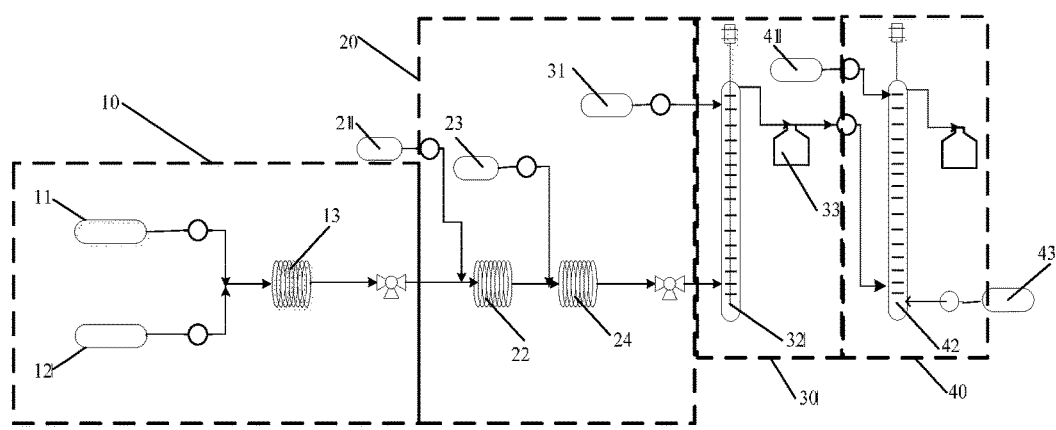

DEVICE FOR CONTINUOUSLY PREPARING 2,6-DIHYDROXYBENZALDEHYDE

CROSS-REFERENCE TO RELATED APPLICATIONS

This is a 35 U.S.C. 371 National Stage Patent Application of International Application No. PCT/CN2019/105754, filed Sep. 12, 2019, which is hereby incorporated by reference in its entirety.

TECHNICAL FIELD

The present disclosure relates to the field of 2,6-dihydroxybenzaldehyde preparation, and in particular to a device for continuously preparing 2,6-dihydroxybenzaldehyde and use thereof.

BACKGROUND 2,6-Dihydroxybenzaldehyde is a very important organic synthetic intermediate. 2,6-Dihydroxybenzaldehyde can be applied in the fields such as, electrical insulating materials, ion exchange resins and dyes, and meanwhile, can be applied in medicine, for example, 2,6-dihydroxybenzaldehyde is an important segment to form a new drug voxelotor for Sickle Cell Disease (SCD). 2,6-Dihydroxybenzaldehyde may have multiple synthetic routes.

For example, 1,3-dimethoxybenzene is used as raw material and subjected to two steps, lithiation and hydroformylation, and demethylation to obtain 2,6-dihydroxybenzaldehyde. The route has easy-to-get raw materials, mild reaction conditions and about 70% of total yield of the two steps, but has more complicated post-reaction treatment due to the use of lewis acid in demethylation, thereby leading to a large amount of "three wastes".

For another example, resorcinol is used as a raw material and only subjected to one step, the route is simpler and has very low cost of material. But resorcinol has poorer reaction selectivity and is easy to produce a large number of by-products 2,4-dihydroxybenzaldehyde (2,6-dihydroxybenzaldehyde:2,4-dihydroxybenzaldehyde=41:24) and has difficulty in product purification.

Resorcinol is further used as a raw material and subjected to three steps to obtain 2,6-dihydroxybenzaldehyde; the first step, resorcinol is reacted with ethyl-vinyl ether such that hydroxy is protected by ethyl-vinyl ether (EVE); the second step, resorcinol 1-position is subjected to lithiation and hydroformylation; the third step, EVE deprotection is performed under acidic conditions to obtain 2,6-dihydroxybenzaldehyde. The route has easy-to-get and cheap raw materials, mild reaction conditions of the three steps, low production cost and has 65.6% of total yield of the three steps.

But in the process of preparing 2,6-dihydroxybenzaldehyde via the three-step method, tetrahydrofuran (THF) is used as a solvent in the first step, and the reaction of resorcinol and ethyl vinyl ether may be completed at room temperature for at least 16 h, moreover, the reaction efficiency will decrease once temperature rises. After production scale expansion, the above method inevitably causes low production efficiency, low production capacity, increased energy consumption and increased production cost. Moreover, after reaction, the demand for post-processing steps, such as, quenching, washing, concentration and water removal further decreases the production efficiency. The second step is that EVE-protected resorcinol is reacted with butyl lithium for 30-40 min at −10 to 0° C. After adding dimethyl formamide (DMF), the reaction is proceeded for 1-2 h at −10 to −5° C. The step is a low temperature reaction, but there are more materials participating in batch reaction, and it is more difficult to transfer heat; therefore, it is difficult to further reduce the reaction temperature. At the end of the reaction, the third step is performed; where hydrochloric acid is used for quenching to regulate pH of the system to 0.7-0.8 for reaction at room temperature, and the reaction also needs 16 h. Similarly, the reaction efficiency decreases once the temperature rises. At the end of the reaction, saturated salt solution is used for washing, and then concentration and replacement are performed into an acetonitrile system after washing, and finally, crystallization is performed in acetonitrile to obtain a product 2,6-dihydroxybenzaldehyde.

As can be seen, the three-step reaction takes long time and has more post-processing procedures of each step. If a conventional batch process is used for large-scale production, it inevitably causes long equipment chain, high occupation of reaction kettle, low production efficiency, high equipment occupancy rate and high production cost.

SUMMARY

The major purpose of the present disclosure is to provide a device for continuously preparing 2,6-dihydroxybenzaldehyde and use thereof, thus solving the problems of low production efficiency and high cost of the 2,6-dihydroxybenzaldehyde preparation technology in the prior art.

To achieve the above purpose, according to an aspect of the present disclosure, provided is a device for continuously preparing 2,6-dihydroxybenzaldehyde; the device comprises a first continuous reaction unit, a second continuous reaction unit, and a third continuous reaction unit connected in series, the first continuous reaction unit is used for hydroxy protection reaction, the second continuous reaction unit is used for lithiation and hydroformylation, and the third continuous reaction unit is used for deprotection reaction, where the third continuous reaction unit comprises: a first columnar continuous reactor, connected to the second continuous reaction unit and used for deprotection of the lithiated hydroformylated product while performing liquid separation to obtain an organic phase containing 2,6-dihydroxybenzaldehyde and an aqueous phase.

Further, the first columnar continuous reactor is equipped with a first stirrer for stirring materials in the first columnar continuous reactor during deprotection treatment and liquid separation.

Further, the third continuous reaction unit further comprises: a deprotection agent supply device, the first columnar continuous reactor sets up a deprotection agent inlet and a lithiated hydroformylated product inlet, the deprotection agent supply device is connected to the deprotection agent inlet, the lithiated hydroformylated product inlet is connected to the second continuous reaction unit, the deprotection agent inlet is preferably provided an upper part of the first columnar continuous reactor, and the lithiated hydroformylated product inlet is preferably provided a lower part of the first columnar continuous reactor.

Further, the device further includes a continuous washing unit, wherein the continuous washing unit comprises a second columnar continuous reactor, the second columnar continuous reactor is connected to the first columnar continuous reactor to wash the organic phase with a washing liquid, and the second columnar continuous reactor is preferably equipped with a second stirrer to stir the materials in the second columnar continuous reactor during washing; preferably, the continuous washing unit further comprises a washing liquid supply device, the second columnar continuous reactor sets up a washing liquid inlet and an organic phase inlet, the washing liquid supply device is connected to the washing liquid inlet, the washing liquid inlet is preferably provided an upper part of the second columnar continuous reactor, and the organic phase inlet is preferably provided a lower part of the second columnar continuous reactor; and preferably, the continuous washing unit further comprises an organic solvent supply device, the second columnar continuous reactor further comprises an organic solvent inlet, the organic solvent inlet is connected to the organic solvent supply device, and the organic solvent inlet is preferably provided under the organic phase inlet.

Further, the above third continuous reaction unit further comprises a buffer tank, wherein the buffer tank is provided between the first columnar continuous reactor and the organic phase inlet.

Further, the second continuous reaction unit comprises: a second coil continuous reactor, setting up a hydroxy protection reaction product inlet, a lithiation agent inlet and a lithiated product outlet, wherein the hydroxy protection reaction product inlet is connected to the first continuous reaction unit, and the second coil continuous reactor is preferably equipped with a second heat exchange jacket; a lithiation agent supply device, connecting to the lithiation agent inlet; a third coil continuous reactor, setting up a lithiated product inlet, a hydroformylation agent inlet and a lithiated hydroformylated product outlet, wherein the lithiated product inlet is connected to the lithiated product outlet, the lithiated hydroformylated product outlet is connected to the third continuous reaction unit, and the third coil continuous reactor is preferably equipped with a third heat exchange jacket; and a hydroformylation agent supply device, connecting to the hydroformylation agent inlet.

Further, the above first continuous reaction unit comprises: a first coil continuous reactor, setting up a reaction material inlet and a hydroxy protection reaction product outlet, wherein the hydroxy protection reaction product outlet is connected to the second continuous reaction unit, and the first coil continuous reactor is preferably equipped with a first heat exchange jacket; a resorcinol solution supply device, connecting to the reaction material inlet; and an ethyl vinyl ether solution supply device, connecting to the reaction material inlet.

Further, a sampling valve is provided in the connection pipeline between the first continuous reaction unit, the second continuous reaction unit and the third continuous reaction unit.

According to another aspect of the present disclosure, provided is use of a device for continuously preparing 2,6-dihydroxybenzaldehyde in continuous preparation of 2,6-dihydroxybenzaldehyde.

Further, the use includes: subjecting resorcinol and ethyl vinyl ether to hydroxy protection reaction in the first continuous reaction unit to obtain a hydroxy protection product system, wherein resorcinol and ethyl vinyl ether are preferably both added to the first continuous reaction unit in the form of a solution, and the temperature of the hydroxy protection reaction is preferably 30 to 45° C., and more preferably 30 to 35° C.; sequentially subjecting the hydroxy protection product system to lithiation and hydroformylation reaction under the action of a lithiation agent and a hydroformylation agent to obtain a lithiated hydroformylated product system, wherein the lithiation agent is preferably butyl lithium, the hydroformylated agent is dimethyl formamide, and the temperature of the lithiation and hydroformylation reaction is −30 to 25° C., more preferably −20 to −15° C. or 5 to 25° C.; removing hydroxy protecting groups of the lithiated and hydroformylated product system by using a deprotection agent in the first columnar continuous reactor to obtain the organic phase containing the 2,6-dihydroxybenzaldehyde, the deprotection agent is preferably an inorganic strong acid, and the deprotection agent is more preferably dilute hydrochloric acid, dilute sulfuric acid or dilute nitric acid, and the temperature for removing the hydroxy protecting group is preferably 30 to 45° C.; and washing the organic phase with a washing agent and an optional organic solvent in the second columnar continuous reactor to obtain a washed organic phase, where the washing agent is preferably a saline solution or an aqueous sodium bicarbonate solution, and the organic solvent is preferably any one of methyl tert butyl ether, ethyl acetate, and 2-methyl tetrahydrofuran.

Further, the retention time of the above resorcinol and the ethyl vinyl ether in the first continuous reaction unit is 20 to 180 min, and the retention time of the deprotection agent and the lithiated and hydroformylated product system in the first columnar continuous reactor is preferably 20 to 180 min.

The technical solution of the present disclosure is applied, and the above device is taken for the preparation of 2,6-dihydroxybenzaldehyde to greatly shorten the time of hydroxy protection reaction and deprotection reaction in the synthetic route. Moreover, the above each continuous reaction unit is connected directly, and the product system obtained by each continuous reaction unit may get into the next continuous reaction unit without postprocessing; after operation of the device, the reaction of each step is performed simultaneously, thereby improving the overall production efficiency. To sum up, when the device is applied in the preparation of 2,6-dihydroxybenzaldehyde, reaction time is shortened and the intermediate purification treatment is no longer required. Therefore, compared with batch process, the present disclosure can greatly save equipment cost and post-processing cost, and greatly improve the production efficiency, more beneficial to the industrial scale-up production of 2,6-dihydroxybenzaldehyde.

BRIEF DESCRIPTION OF THE DRAWINGS

Drawings of the description constituting a portion of the present disclosure are used to further understand the present disclosure; and schematic examples and specification thereof of the present disclosure are used to explain the present disclosure, and are not intended to limit the present disclosure improperly. In the drawings:

FIG. 1 is a structure diagram showing a device for continuously preparing 2,6-dihydroxybenzaldehyde provided in a preferred embodiment of the present disclosure.

The above drawings include the following denotation:
- 10. First continuous reaction unit; 11. Resorcinol solution supply device; 12. Ethyl vinyl ether solution; 13. First coil continuous reactor;
- 20. Second continuous reaction unit; 21. Lithiation agent supply device; 22. Second coil continuous reactor; 23. Hydroformylation agent supply device; 24. Third coil continuous reactor;
- 30. Third continuous reaction unit; 31. Deprotection agent supply device; 32. First columnar continuous reactor; 33. Buffer tank;

40. Continuous reaction unit; 41. Washing liquid supply device; 42. Second columnar continuous reactor; 43. Organic solvent supply device.

DETAILED DESCRIPTION OF THE EMBODIMENTS

It should be noted that the examples of the present application and the characteristics of the embodiments can be mutually combined under the condition of no conflict. The present disclosure will be described specifically by reference to drawings and in combination with embodiments hereafter.

As analyzed in the Background of the present disclosure, the preparation process of 2,6-dihydroxybenzaldehyde in the prior art has low production efficiency and high cost. To solve the problems, the present disclosure provides a device for continuously preparing 2,6-dihydroxybenzaldehyde and use thereof.

In a typical embodiment of the present disclosure, provided is a device for continuously preparing 2,6-dihydroxybenzaldehyde; as shown in FIG. 1, the device includes a first continuous reaction unit 10, a second continuous reaction unit 20, and a third continuous reaction unit 30 connected in series, the first continuous reaction unit 10 is used for hydroxy protection reaction, the second continuous reaction unit 20 is used for lithiation and hydroformylation, and the third continuous reaction unit 30 is used for deprotection reaction, wherein the third continuous reaction unit 30 includes: a first columnar continuous reactor 32, the first columnar continuous reactor 32 connected to the second continuous reaction unit 20 and used for deprotection of the lithiated hydroformylated product while performing liquid separation to obtain an organic phase containing 2,6-dihydroxybenzaldehyde and an aqueous phase.

The device is taken for the preparation of 2,6-dihydroxybenzaldehyde, which may greatly shorten the time of hydroxy protection reaction and deprotection reaction in the synthetic route. Moreover, the each continuous reaction unit is connected directly, and a product system obtained by the each continuous reaction unit may get into the next continuous reaction unit without postprocessing; after operation of the device, a reaction of each step is performed simultaneously, thereby improving the overall production efficiency. To sum up, when the device is applied in the preparation of 2,6-dihydroxybenzaldehyde, reaction time is shortened and the intermediate purification treatment is no longer required. Therefore, compared with batch process, the present disclosure can greatly save equipment cost and post-processing cost, and greatly improve the production efficiency, more beneficial to the industrial scale-up production of 2,6-dihydroxybenzaldehyde.

In one embodiment, to quicken the reaction procedure, the first columnar continuous reactor 32 is preferably equipped with a first stirrer for stirring materials in the first columnar continuous reactor 32 during deprotection treatment and liquid separation.

To improve the controllability of the reaction process of the third continuous reaction unit 30, preferably as shown in FIG. 1, the third continuous reaction unit 30 further comprises: a deprotection agent supply device 31, the first columnar continuous reactor 32 has a deprotection agent inlet and a lithiated hydroformylated product inlet, the deprotection agent supply device 31 is connected to the deprotection agent inlet, and the lithiated hydroformylated product inlet is connected to the second continuous reaction unit 20. The deprotection agent supply device 31 is utilized to supply the deprotection agent to the first columnar continuous reactor 32, thus controlling the reaction process by regulating the supply speed, thereby improving the conversion rate of materials. Moreover, to improve the treatment efficiency of the deprotection and separation efficiency of the organic phase and aqueous phase; preferably, the deprotection agent inlet is preferably provided an upper part of the first columnar continuous reactor 32; and the lithiated hydroformylated product inlet is preferably provided a lower part of the first columnar continuous reactor 32. The position configuration of the above deprotection agent inlet and lithiated hydroformylated product inlet makes the deprotection agent in countercurrent contact with the lithiated hydroformylated product, and during the contact process, the columnar continuous reactor is beneficial to the separation of aqueous phase from organic phase due to the action of gravity, thus improving the product treatment efficiency.

To further improve the product treatment efficiency and purity; preferably, as shown in FIG. 1, the device further comprises a continuous washing unit 40, and the continuous washing unit 40 comprises a second columnar continuous reactor 42, and the second columnar continuous reactor 42 is connected to the first columnar continuous reactor 32 to make use of washing liquid to wash the organic phase. The second columnar continuous reactor 42 is utilized to wash the organic phase, which is also beneficial to the separation of aqueous phase from organic phase. To improve the washing rate, the above second columnar continuous reactor 42 is preferably equipped with a second stirrer for stirring materials in the second columnar continuous reactor 42 during washing process.

Furthermore, to improve the controllability of the product washing effect and efficiency, preferably, as shown in FIG. 1, the continuous washing unit 40 further comprises a washing liquid supply device 41; the second columnar continuous reactor 42 sets up a washing liquid inlet and an organic phase inlet; the washing liquid supply device 41 is connected to the washing liquid inlet. The washing liquid supply device 41 is utilized to supply washing liquid to the second columnar continuous reactor 42, and the supply rate is regulated to control the washing rate and washing effect. Further, preferably, the washing liquid inlet is preferably provided an upper part of the second columnar continuous reactor 42; and the organic phase inlet is preferably provided a lower part of the second columnar continuous reactor 42. The configuration position of the washing liquid inlet and the organic phase inlet is beneficial to the countercurrent contact of the washing liquid with organic phase, thus improving the washing efficiency. At the same time, the columnar continuous reactor is beneficial to the separation of the organic phase from the aqueous phase, which namely integrates washing with separation, thereby improving the product treatment efficiency.

Preferably, the continuous washing unit 40 further comprises an organic solvent supply device 43; the second columnar continuous reactor 42 further comprises an organic solvent inlet, the organic solvent inlet is connected to the organic solvent supply device 43, and the organic solvent inlet is preferably provided under the organic phase inlet. The organic solvent is utilized to increase the solubility of 2,6-dihydroxybenzaldehyde therein, thus decreasing the loss of 2,6-dihydroxybenzaldehyde.

After chemical reaction finished, the obtained product system is more stable in the organic phase after being subjected to liquid separation by the first columnar continuous reactor 32. To improve the washing production efficiency, preferably, as shown in FIG. 1, the third continuous reaction unit 30 further comprises a buffer tank 33; the buffer tank 33 is provided between the first columnar continuous reactor 32 and the organic phase inlet. By providing the buffer tank 33, it can be washed when the organic phase accumulates to a certain amount to improve the utilization rate and washing amount of the washing liquid.

In one embodiment of the present application, as shown in FIG. 1, the above second continuous reaction unit 20 comprise a second coil continuous reactor 22, a lithiation agent supply device 21, a third coil continuous reactor 24, and a hydroformylation agent supply device 23; the second coil continuous reactor 22 has a hydroxy protection reaction product inlet, a lithiation agent inlet and a lithiated product outlet; the hydroxy protection reaction product inlet is connected to the first continuous reaction unit 10; the lithiation agent supply device 21 is connected to the lithiation agent inlet; the third coil continuous reactor 24 has a lithiated product inlet, a hydroformylation agent inlet and a lithiated hydroformylated product outlet; the lithiated product inlet is connected to the lithiated product outlet, the lithiated hydroformylated product outlet is connected to the third continuous reaction unit 30, and the hydroformylation agent supply device 23 is connected to the hydroformylation agent inlet. The second continuous reaction unit 20 is utilized to make a lithiation reaction of the lithiation agent with the hydroxy protection reaction product in the second coil continuous reactor 22; and the lithiated product is directly put to the third coil continuous reactor 24 for hydroformylation, such that lithiation and hydroformylation are separately and continuously performed, thus achieving a higher use ratio of materials. Furthermore, the second coil continuous reactor 22 is preferably equipped with a second heat exchange jacket; the third coil continuous reactor 24 is preferably equipped with a third heat exchange jacket; heat exchange jackets are utilized to control the temperature of the second coil continuous reactor 22 and the third coil continuous reactor 24. On the one hand, the heat exchange jacket is simple in structure, on the other hand, has more uniform heat exchange.

In another embodiment of the present application, as shown in FIG. 1, the first continuous reaction unit 10 comprises: a first coil continuous reactor 13, a resorcinol solution supply device 11, an ethyl vinyl ether solution supply device 12; the first coil continuous reactor 13 has a reaction material inlet and a hydroxy protection reaction product outlet; the hydroxy protection reaction product outlet is connected to the second continuous reaction unit 20, and the first coil continuous reactor 13 is preferably equipped with a first heat exchange jacket; the resorcinol solution supply device 11 is connected to the reaction material inlet; and the ethyl vinyl ether solution supply device 12 is connected to the reaction material inlet. Resorcinol and ethyl vinyl ether are reacted with each other in the first coil continuous reactor 13 while moving forward; because the coil has a smaller cross sectional area, the materials in the coil are heated more uniformly; moreover, the contact effect of material has been improved. Therefore, directed to the same weight of materials, the reaction time thereof in the device of the present application shortens relative to the reaction time of the reaction in the existing batch device.

Further, to control the product quality of each reaction unit, a sampling valve is preferably provided in the connection pipeline between the first continuous reaction unit 10, the second continuous reaction unit 20 and the third continuous reaction unit 30. Products of the first continuous reaction unit 10, the second continuous reaction unit 20 and the third continuous reaction unit 30 are detected with the sampling valve. According to the detection results, the flow rate of the materials and reaction temperature are adjusted in time if necessary, thus ensuring the conversion rate of the raw materials and product quality.

In the other typical embodiment of the present disclosure, provided is use of a device for continuously preparing 2,6-dihydroxybenzaldehyde in continuous preparation of 2,6-dihydroxybenzaldehyde.

The above device is taken for the preparation of 2,6-dihydroxybenzaldehyde, which may greatly shorten the time of hydroxy protection reaction and deprotection reaction in the synthetic route. Moreover, each the continuous reaction unit is connected directly, and the product system obtained by each continuous reaction unit may get into the next continuous reaction unit without postprocessing; after operation of the device, the reaction of each step is performed simultaneously, thereby improving the overall production efficiency. To sum up, when the device is applied in the preparation of 2,6-dihydroxybenzaldehyde, reaction time is shortened and the intermediate purification treatment is no longer required. Therefore, compared with batch process, the present disclosure can greatly save equipment cost and greatly improve the production efficiency, more beneficial to the industrial scale-up production of 2,6-dihydroxybenzaldehyde.

In one embodiment, the use comprises: subjecting resorcinol and ethyl vinyl ether to hydroxy protection reaction in the first continuous reaction unit 10 to obtain a hydroxy protection product system, sequentially subjecting the hydroxy protection product system to lithiation and hydroformylation reaction with the action of a lithiation agent and a hydroformylation agent in the second continuous reaction unit 20 to obtain a lithiated hydroformylated product system; removing hydroxy protecting groups of the lithiated and hydroformylated product system by using a deprotection agent in the first columnar continuous reactor 32 to obtain the organic phase containing 2,6-dihydroxybenzaldehyde; and washing the organic phase with a washing agent and an optional organic solvent in the second columnar continuous reactor 42 to obtain a washed organic phase. The use of the present application transforms the existing batch by a three-step method into a continuous process; each step requires no post-processing and the next step may be performed directly, thus improving the production efficiency. The resorcinol and the ethyl vinyl ether may be the same as those in the prior art, and added to the first continuous reaction unit 10 in the form of a solution, for example, resorcinol and ethyl vinyl ether are dissolved by using tetrahydrofuran and other polar solvents to form the corresponding solution. Preferably, the lithiation agent is butyl lithium, and the hydroformylation agent is dimethyl formamide, thus ensuring the stability of the reaction. The above deprotection agent is preferably an inorganic strong acid, further preferably, the deprotection agent is diluted hydrochloric acid, dilute sulphuric acid or dilute nitric acid. Furthermore, water may be used as a detergent in washing process. To improve the washing efficiency, the above detergent is preferably saline solution or sodium bicarbonate aqueous solution. The selection principle of the above organic solvent is that the organic solvent has good solubility to 2,6-dihydroxybenzaldehyde and is easy to volatilize for removal in concentration process, preferably, the organic solvent is any of methyl tert-butyl ether, ethyl acetate and 2-methyltetrahydrofuran.

Since the continuous reaction makes the heat produced by the materials participating in reaction per unit time easy to be transferred to the outside, the reaction temperature of each reaction is further expanded. To improve the reaction speed of the hydroxy protection reaction and decrease the occurrence of side reaction, preferably, the hydroxy protection reaction has a temperature of 30-45° C., more preferably, 30-35° C. Preferably, the above lithiation and hydroformylation reaction has a temperature of −30 to 25° C. To improve the yield of target products in the lithiation and hydroformylation reaction, more preferably, the lithiation and hydroformylation reaction has a temperature of −20 to −15° C. To decrease the use of heat energy and reduce the cost, preferably, the above lithiation and hydroformylation reaction has a temperature of 5 to 25° C. Moreover, to improve the rate of removing hydroxy protecting groups, preferably, the removing temperature of the hydroxy protecting groups is 30-45° C.

In one embodiment of the present disclosure, based on the characteristics of the first continuous reaction unit 10, the reaction time of resorcinol and the ethyl vinyl ether shortens. To improve the production efficiency, preferably, the retention time of the resorcinol and the ethyl vinyl ether in the first continuous reaction unit 10 is 20 to 180 min. And based on the characteristics of the first columnar continuous reactor 32, the retention time of the deprotection shortens; similarly, to improve the production efficiency, preferably, the retention time of the deprotection agent and the lithiated hydroformylated product in the first columnar continuous reactor 32 is 20 to 180 min.

The beneficial effects of the present disclosure will be further described in combination with embodiment s and Comparative embodiment s.

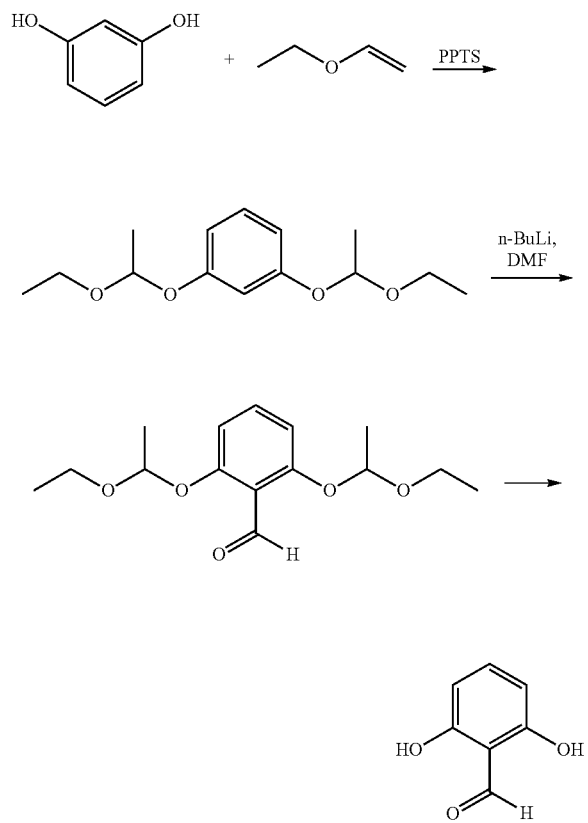

The preparation of 2,6-dihydroxybenzaldehyde is performed by the above route with the device as shown in FIG. 1, where, the molar ratio of resorcinol to ethyl vinyl ether is 1:3; the molar ratio of resorcinol to butyl lithium is 1:1.4; the molar ratio of resorcinol to dimethyl formamide is 1:3.5, and the molar ratio of resorcinol to $H^+$ in diluted hydrochloric acid is 1:4.

A tetrahydrofuran solution of resorcinol and a tetrahydrofuran solution of ethyl vinyl ether were continuously put to a first coil continuous reactor 13, and a temperature $T_1$ of the first coil continuous reactor 13 was controlled by a first heat exchange jacket for hydroxy protection reaction with a retention time of $t_1$, thus obtaining a hydroxy protection product system; the hydroxy protection product system and butyl lithium were continuously put to a second coil continuous reactor 22, and a temperature $T_2$ of the second coil continuous reactor 22 was controlled by a second heat exchange jacket for lithiation reaction with a retention time of $t_2$; the obtained lithiation product system and dimethyl formamide were continuously put to a third coil continuous reactor 24, and a temperature $T_3$ of the third coil continuous reactor 24 was controlled by a third heat exchange jacket for hydroformylation reaction with a retention time of $t_3$, the obtained lithiated and hydroformylated product system was fed from a lower part of the first columnar continuous reactor 32 and diluted hydrochloric acid was fed from an upper part of the first columnar continuous reactor 32, and both were subjected to countercurrent contact in the first columnar continuous reactor 32 for deprotection reaction, thus obtaining an organic phase containing 2,6-dihydroxybenzaldehyde which was separated from the aqueous phase, wherein, the deprotection reaction had a temperature of $T_4$ and retention time of $t_4$; the organic phase containing 2,6-dihydroxybenzaldehyde is located above and the aqueous phase is below. The organic phase is fed from a lower part of the second columnar continuous reactor 42, and methyl tert butyl ether is fed from a lower part of the second columnar continuous reactor 42 and the inlet is located below the organic phase inlet; saline solution is fed from an upper part of the second columnar continuous reactor 42, the three are subjected to countercurrent contact washing in the second columnar continuous reactor 42 with a volume ratio of the organic phase to the methyl tert butyl ether to the saline solution of 5:2:2 (counted according to a mass of resorcinol, for example, there were 1 g resorcinol, 5 mL organic phase, 2 mL methyl tert butyl ether and 2 mL saline solution), thus obtaining the washed and layered organic phase and aqueous phase, wherein, a retention time is $t_5$, the organic phase is located above, the aqueous phase is below, and the organic phase contains 2,6-dihydroxybenzaldehyde. After the washed organic phase was concentrated and replaced into an acetonitrile system, and finally, crystallization was performed in acetonitrile to obtain a product 2,6-dihydroxybenzaldehyde.

Resorcinol in the above tetrahydrofuran solution of resorcinol has a content of 30%, and ethyl vinyl ether in the tetrahydrofuran solution of ethyl vinyl ether has content of 80 wt %; the butyl lithium has concentration of 2.0 M, diluted hydrochloric acid has concentration of 3 M and saline solution has concentration of 20 wt %. Each supply equipment in each embodiment is used to adjust the flow rate to control the retention time in each continuous reactor; specifically, the temperature, retention time, and other technical parameters and yield in each reactor of each example are shown in Table 1.

TABLE 1

|  | Scale | $T_1$/° C. | $t_1$/h | $T_2$/° C. | $t_2$/h | $T_3$/° C. | $t_3$/min | $T_4$/° C. | $t_4$/h | $t_5$/min | Operation time/h | Total yield of the three steps/ |
|---|---|---|---|---|---|---|---|---|---|---|---|---|
| Embodiment 1 | 100 kg | 30~35 | 1.5 | −20~−10 | 1.5 | −20~−10 | 60 | 30~35 | 3.0 | 10 | 21 | 80% |
| Embodiment 2 | 100 kg | 40~45 | 0.5 | −10~0 | 1.0 | −10~0 | 30 | 40~45 | 1.5 | 10 | 15 | 74% |
| Embodiment 3 | 100 kg | 20~25 | 3 | 0~10 | 0.5 | 0~10 | 15 | 20~25 | 1.0 | 10 | 30 | 78% |
| Embodiment 4 | 1000 kg | 30~35 | 1.5 | −10~0 | 1.0 | −10~0 | 15 | 30~35 | 1.5 | 10 | 210 | 82% |
| Embodiment 5 | 1000 kg | 30~35 | 2.0 | −10~0 | 0.5 | −10~0 | 15 | 30~35 | 1.5 | 10 | 180 | 81% |

The preparation of 2,6-dihydroxybenzaldehyde was performed with the materials the same as those in the preceding embodiments with the batch reactor of Table 2. The hydroxy protection reaction has a temperature of 20-25° C.; the lithiation and hydroformylation reaction has a temperature of −10 to 0° C.; and the deprotection reaction has a temperature of 20-25° C.

TABLE 2

|  | Production scale | Hydroxy protection reaction | | Lithiation and hydroformylation reaction | | Deprotection reaction | | Washing step | | Total yield of the three steps |
|---|---|---|---|---|---|---|---|---|---|---|
|  |  | Reactor | Reaction time | Reactor | Reaction time | Reactor | Reaction time | Reactor | Reaction time |  |
| Batch reaction process | 100 Kg | 3000 L enamel still *2 | 5 days | 3000 L low temperature kettle *1 | 1 d | 3000 L enamel still *2 | 5 days | 3000 L enamel still *2 | 1 day | 65.6% |
|  | 1000 Kg | 3000 L enamel still *2 | 18 days | 3000 L low temperature kettle *2 | 5 days | 3000 L enamel still *3 | 20 days | 3000 L enamel still *2 | 5 days |  |

It can be seen from the above description that the embodiments of the present disclosure achieve the following technical effects:

The device is taken for the preparation of 2,6-dihydroxybenzaldehyde, which may greatly shorten the time of hydroxy protection reaction and deprotection reaction in the synthetic route. Moreover, the above each continuous reaction unit is connected directly, and the product system obtained by each continuous reaction unit may get into the next continuous reaction unit without postprocessing; after operation of the device, the reaction of each step is performed simultaneously, thereby improving the overall production efficiency. To sum up, when the device is applied in the preparation of 2,6-dihydroxybenzaldehyde, reaction time is shortened and the intermediate purification treatment is no longer required. Therefore, compared with batch process, the present disclosure can greatly save equipment cost and greatly improve the production efficiency, more beneficial to the industrial scale-up production of 2,6-dihydroxybenzaldehyde.

The above mentioned are merely preferred examples of the present disclosure, and are not construed as limiting the present disclosure. A person skilled in the art knows that the present disclosure may have various changes and alterations. Any amendment, equivalent replacement, improvement and the like made within the spirit and principle of the present disclosure should be included within the protection scope of the present disclosure.

What is claimed is:

1. A device for continuously preparing 2,6-dihydroxybenzaldehyde, wherein the device comprises a first continuous reaction units, a second continuous reaction unit, and a third continuous reaction unit connected in series, the first continuous reaction units is used for hydroxy protection reaction, the second continuous reaction unit is used for lithiation and hydroformylation, and the third continuous reaction unit is used for deprotection reaction, wherein the third continuous reaction unit comprises:
   a first columnar continuous reactor (32), connected to the second continuous reaction unit (20) and used for deprotection of the lithiated hydroformylated product while performing liquid separation to obtain an organic phase containing 2,6-dihydroxybenzaldehyde and an aqueous phase;
   a deprotection agent supply device, the first columnar continuous reactor sets up a deprotection agent inlet and a lithiated hydroformylated product inlet, the deprotection agent supply device is connected to the deprotection agent inlet, the lithiated hydroformylated product inlet is connected to the second continuous reaction unit.

2. The device according to claim 1, wherein the first columnar continuous reactor is equipped with a first stirrer for stirring materials in the first columnar continuous reactor during deprotection treatment and liquid separation.

3. The device according to claim 1, wherein the deprotection agent inlet is provided a upper part of the first columnar continuous reactor, and the lithiated hydroformylated product inlet is provided a lower part of the first columnar continuous reactor.

4. The device according to claim 3, wherein the device further comprises a continuous washing unit, wherein the continuous washing unit comprises a second columnar continuous reactor, the second columnar continuous reactor is connected to the first columnar continuous reactor to wash the organic phase with a washing liquid.

5. The device according to claim 4, wherein the third continuous reaction unit further comprises a buffer tank, wherein the buffer tank is provided between the first columnar continuous reactor and the organic phase inlet.

6. The device according to claim 1, wherein the second continuous reaction unit comprises:
   a second coil continuous reactor, setting up a hydroxy protection reaction product inlet, a lithiation agent inlet and a lithiated product outlet, wherein the hydroxy protection reaction product inlet is connected to the first continuous reaction unit (10);
   a lithiation agent supply device, connecting to the lithiation agent inlet;
   a third coil continuous reactor, setting up a lithiated product inlet, a hydroformylation agent inlet and a lithiated hydroformylated product outlet, wherein the lithiated product inlet is connected to the lithiated product outlet, the lithiated hydroformylated product outlet is connected to the third continuous reaction unit; and
   a hydroformylation agent supply device, connecting to the hydroformylation agent inlet.

7. The device according to claim 1, wherein the first continuous reaction unit comprises:
   a first coil continuous reactor, setting up a reaction material inlet and a hydroxy protection reaction product outlet, wherein the hydroxy protection reaction product outlet is connected to the second continuous reaction unit;
   a resorcinol solution supply device, connecting to the reaction material inlet; and
   an ethyl vinyl ether solution supply device, connecting to the reaction material inlet.

8. The device according to claim 1, wherein a sampling valve is provided in connection pipelines between the first continuous reaction unit, the second continuous reaction unit and the third continuous reaction unit.

9. The device according to claim 2, wherein the deprotection agent inlet is provided a upper part of the first columnar continuous reactor, and the lithiated hydroformylated product inlet is provided a lower part of the first columnar continuous reactor.

10. The device according to claim 9, wherein the device further comprises a continuous washing unit, wherein the continuous washing unit comprises a second columnar continuous reactor, the second columnar continuous reactor is connected to the first columnar continuous reactor to wash the organic phase with a washing liquid.

11. The device according to claim 10, wherein the third continuous reaction unit further comprises a buffer tank, wherein the buffer tank is provided between the first columnar continuous reactor and the organic phase inlet.

12. The device according to claim 4, wherein the second columnar continuous reactor is equipped with a second stirrer to stir the materials in the second columnar continuous reactor during washing.

13. The device according to claim 4, wherein the continuous washing unit further comprises a washing liquid supply device, the second columnar continuous reactor sets up a washing liquid inlet and an organic phase inlet, the washing liquid supply device is connected to the washing liquid inlet.

14. The device according to claim 4, wherein the washing liquid inlet is provided a upper part of the second columnar continuous reactor, and the organic phase inlet is provided a lower part of the second columnar continuous reactor.

15. The device according to claim 4, wherein the continuous washing unit further comprises an organic solvent supply device, the second columnar continuous reactor further comprises an organic solvent inlet, the organic solvent inlet is connected to the organic solvent supply device, and the organic solvent inlet is provided under the organic phase inlet.

16. The device according to claim 6, wherein the second coil continuous reactor is equipped with a second heat exchange jacket, and the third coil continuous reactor is equipped with a third heat exchange jacket.

17. The device according to claim 7, wherein the first coil continuous reactor is equipped with a first heat exchange jacket.

18. Use of the device for continuously preparing 2,6-dihydroxybenzaldehyde according to claim 1 in the continuous preparation of 2,6-dihydroxybenzaldehyde; wherein the use comprises:
   subjecting resorcinol and ethyl vinyl ether to hydroxy protection reaction in the first continuous reaction to obtain a hydroxy protection product system;
   sequentially subjecting the hydroxy protection product system to lithiation and hydroformylation reaction under the action of a lithiation agent and a hydroformylation agent to obtain a lithiated hydroformylated product system;
   removing hydroxy protecting groups of the lithiated hydroformylated product system by using a deprotection agent in the first columnar continuous reactor to obtain the organic phase containing the 2,6-dihydroxybenzaldehyde; and
   washing the organic phase with a washing agent and an optional organic solvent in a second columnar continuos reactor to obtain a washed organic phase.

19. The use according to claim 18, wherein
   resorcinol and ethyl vinyl ether are both added to the first continuous reaction unit in the form of a solution, and the temperature of the hydroxy protection reaction is 30 to 45° C.;
   the lithiation agent is butyl lithium, the hydroformylated agent is dimethylformamide, and the temperature of the lithiation and hydroformylation reaction is −30 to 25° C.;
   the deprotection agent is dilute hydrochloric acid, dilute sulfuric acid or dilute nitric acid, and the temperature for removing the hydroxy protecting groups is 30 to 45° C.; and
   the washing agent is a saline solution or an aqueous sodium bicarbonate solution, and the organic solvent is any one of methyl tert butyl ether, ethyl acetate, and 2-methyl tetrahydrofuran.

20. The use according to claim 19, wherein the retention time of the resorcinol and the ethyl vinyl ether in the first continuous reaction unit is 20 to 180 min, and the retention time of the deprotection agent and the lithiated hydroformylated product system in the first columnar continuous reactor (32) is 20 to 180 min.

* * * * *